United States Patent [19]
Buser et al.

[11] 3,828,250
[45] Aug. 6, 1974

[54] ELECTROSTATIC CHARGE MEASURING DEVICE

[75] Inventors: Rudolf G. Buser, Wall; Helmuth M. Kaunzinger, Neptune, both of N.J.

[73] Assignee: The United States of America as represented by the Secretary of the Army, Washington, D.C.

[22] Filed: July 2, 1973

[21] Appl. No.: 376,022

[52] U.S. Cl. .................................. 324/72
[51] Int. Cl. ............................... G01r 31/02
[58] Field of Search ................. 324/72, 32, 111

[56] References Cited
UNITED STATES PATENTS

| | | | |
|---|---|---|---|
| 2,349,437 | 5/1944 | Keeler | 324/111 X |
| 3,344,344 | 9/1967 | Wales, Jr. | 324/32 |
| 3,443,225 | 5/1969 | Moorhead | 324/76 D |

OTHER PUBLICATIONS
R. W. Tyler, T. H. Webb, W. C. York, "Measurement of Electricl Polarization in Thin Dielectric Materials," Journal of Applied Physics, Vol. 26, No. 1, Jan. 1955, pp. 61–68.

*Primary Examiner*—Alfred E. Smith
*Assistant Examiner*—Rolf Hille
*Attorney, Agent, or Firm*—Jeremiah G. Murray; Herbert Berl; Edward J. Kelly

[57] ABSTRACT

This disclosure relates to field strength meters and particularly to meters for detecting and indicating the strength of an electrostatic field in the vicinity of an aircraft. More particularly, this invention relates to a device that uses the inverse of the Van der Graaf generator principle for charging a series of plates, successively, to the potential of a given area of the outer surface of an aircraft and carrying the charged plates within the metal shell of the aircraft to measure the charge on the plates, which is proportional to the electrostatic charge on the adjacent surface of the aircraft.

6 Claims, 2 Drawing Figures

PATENTED AUG 6 1974        3,828,250

ELECTROSTATIC CHARGE MEASURING DEVICE

BACKGROUND OF THE INVENTION

Electrostatic charges are generated in a well known manner and charges may be built up on many types of moving equipment. On some equipments, such as moving aircraft, electrostatic charges can reach extremely high values and build up potentials that can become hazardous as the aircraft approaches ground or an oppositely charged body. It becomes necessary to provide a means for measuring the strength of the electrostatic field between an aircraft and an adjacent object or ground to determine whether or not the electrostatic potential between the two is at a dangerous level and whether or not some means should be employed to discharge the aircraft before any harm is done.

There are some known methods for measuring the strength of an electrostatic field, which are used indirectly to measure electrostatic charge. The best known are devices of the electrometer type that have very-light, fragile vanes that repel each other and separate when charged to give an indication of the charge voltage. These electrometers are mainly laboratory devices and are cumbersome as well as fragile and would not work well, if at all, in a moving vehicle.

For more rugged use, such as in an aircraft in flight, the field mill has been the best available means for measuring the relative strength of electrostatic fields. The field mill makes use of a rotating vane that alternately exposes and shields a sensor electrode positioned in the electrostatic field. This method produces a pulsating voltage on the sensor that is proportional to the field strength and that can be readily amplified and applied to a device for indicating the relative field strength.

However, the field mill and other devices of this type can only measure the charge indirectly. The actual charge is a function of the capacity of and the voltage on the aircraft involved. Both voltage and capacitance are affected by inhomogenities of the electrostatic field aggravated by disturbing influences such as machinery or trees in the vicinity.

SUMMARY OF THE INVENTION

The actual amount of charge can be read directly and accurately by a device that uses the Van der Graaf generator principle in reverse. It has a rotor drum with a series of metallic plates spaced about its periphery. The drum extends through an opening in the fusilage of an aircraft — or any other device whose electrostatic-field potential is to be measured. The surface of the drum is level with the surface of the aircraft. As the drum is rotated, each of the plates, in turn, is brought to the surface of the aircraft where it comes in contact with an externally mounted contact arm which charges each plate to the potential of the adjacent outside surface of the aircraft, with respect to zero or reference potential existing inside the aircraft, which acts as a Farady cage.

The rotor then carries away each plate, still charged to the potential of the surface of the aircraft. As each plate passes inside of the aircraft, or within its enclosure, it passes off this relative charge to another contact that is connected to the input of an amplifier. The amplifier responds to the relative charge on each successive plate and its output may be connected to an indicator, to show the relative strength of the external electrostatic field, or to any other device needed to convert this field strength into a useful form.

The data obtained from a single device is a measure of charge concentration on the adjacent external surface. If a pair of such devices is used on opposing surfaces, then the total charge can be determined by reading the difference of the outputs of the two devices. Opposing surfaces are required to compensate for charge separations induced by external, electrostatic fields.

DETAILED DESCRIPTION OF THE PREFERRED EMBODIMENT

Figure 1:
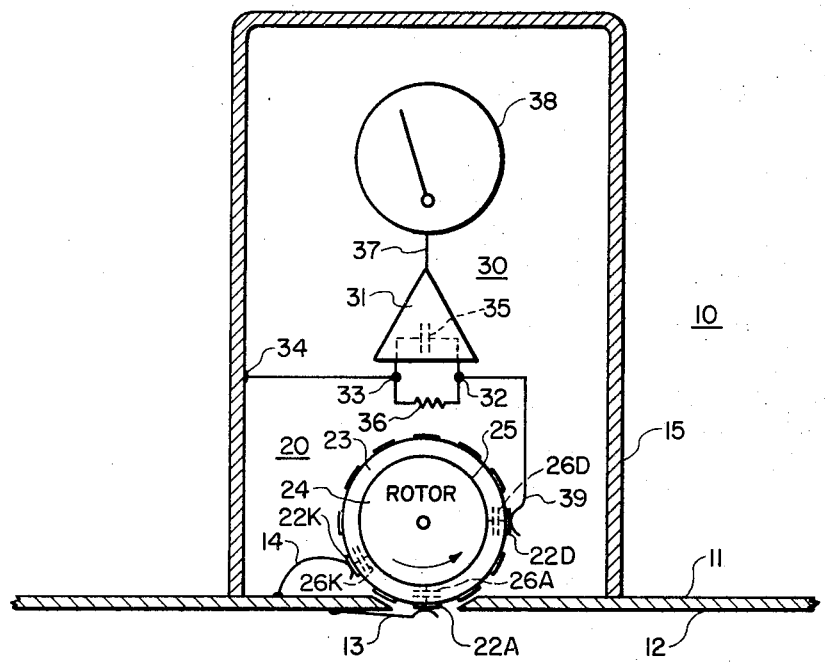
FIG. 1 shows the layout of a typical device mounted in a portion of the fusilage of an aircraft.

Referring now particularly to FIG. 1, an aircraft fusilage 10 has an inside surface 11 and an outside surface 12. A contact arm 13 is on the outer surface of the aircraft and another contact arm 14 is on the inner side of the aircraft within a shielding enclosure 15. The metallic portions of the fusilage of the aircraft and the enclosure 15 are shown in cross section. An inverted Van der Graaf type of apparatus 20, mounted within the enclosure 15, includes a rotor 24 and a series of metallic strips or plates 22A through 22K. These strips are mounted on an insulating layer 23 on top of a concentric, metallic cylinder or drum 25 that may be connected, through the rotor, to the enclosure 15 and the internal surface of the aircraft. 26A through 26K represent the effective capacities between the strips 22A through 22K and the surface of the metallic cylinder 25 of the rotor.

A charge concentration measuring and indicating device 30 includes an amplifier 31 having input terminals 32 and 33. Terminal 33 is connected to the surface of the box 15 at a point 34. The effective capacity of the amplifier input is indicated by 35 and the resistance across the input terminals is indicated by 36. An output 37 of the amplifier 31 is connected to a meter or indicator 38.

Figure 2:
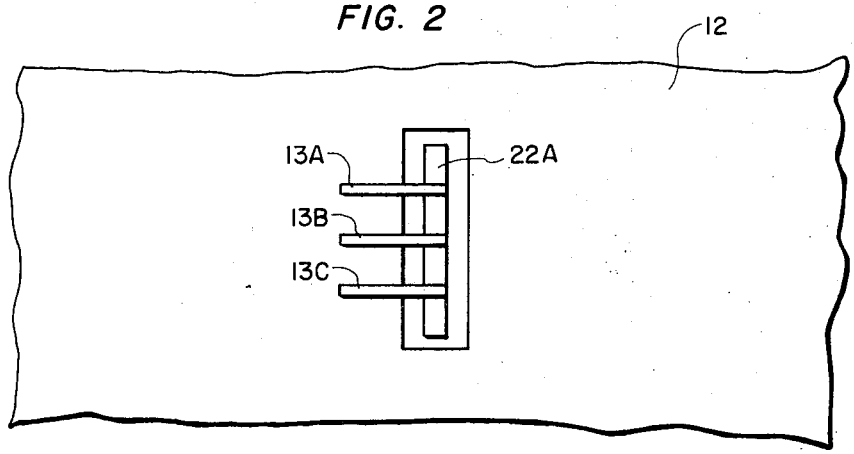
FIG. 2 shows the plan view of the device from below the aircraft.

FIG. 2 shows a plan view of the surface of the aircraft looking up towards the device. This shows outside surface 12 of the aircraft and contact arms 13A, 13B and 13C corresponding to the contact arm 13 in profile in FIG. 1. These arms contact the metallic strip 22A which is also visible through the opening in the fusilage.

In operation, as the aircraft approaches ground or some other object of a different charge, an electrostatic field is set up between the aircraft and the object, and the electrons are attracted to - or repelled from - the outer surface 12 of the fusilage adjacent to the object, thereby charging this surface with respect to the inner surface 11 and the enclosure 15 within the aircraft. The opposing aircraft surface may be charged to a different level and polarity.

Some of this external charge on the outer surface 12 is applied by the contact arms 13 to the metallic strip 22A. As the rotor 24 turns, in a counterclockwise direction here, the strip 22A will first leave the contact arm 13 and a charge will remain on the strip 22A.

As the rotor 24 turns further, the charged metallic strip 22A, is carried inside the enclosure into contact with the brush 39 which is connected to the input terminal 32 of the amplifier 31. The charge on metallic strip 22A is then discharged through the resistor 36 and the effective input capacity 35 of the amplifier 31. The resultant potential across terminals 32 and 33 is amplified and passed from the output 37 of the amplifier to the meter 38 which indicates the relative field strength between the surface of the aircraft and the ground or object below.

As the rotation continues, the successive strips 22A through 22K are charged from the outer surface 12. These strips 22A through 22K successively transfer this charge from contact 13 to contact 39 where they are discharged through the input of the amplifier 31. Then the strips are carried around further in a counterclockwise direction until they reappear at the outside of the aircraft at 22A where they are recharged again, by the contact arms 13, to the then-existing charge on the outer surface of the aircraft.

An additional brush 14 at the potential of the inside surface of the aircraft may be positioned after the contact 39 to completely discharge the metallic strip 22K of any residual charge. This will provide more accurate charging conditions and respond more quickly to changes in the exterior surface charge, particularly if the effective resistance 36 of the input of the amplifier is extremely high, and a voltage rather than a current measurement of the effective charge on each metallic strip is being made.

It is obvious that the resistor 36 may have either a high or a low value. If the resistance is high, as noted, the voltage on the plate 22D will be applied by brush 39 across the effective capacity 35 at the input of the amplifier 31, but the metallic strip 22D will leave the brush 39 before the effective capacitor 26D is discharged. The capacity 35 will integrate the overall voltages from contact to contact unless the resistance 36 is low enough to discharge the effective capacities 35 and 26D between contacts. Therefore, the value of the resistor 36 must be low enough to draw off enough of the charge from the capacity 35 and the metallic strip 22D to reduce their effective potential to the point where succeeding charges on succeeding metallic strips, of a lower value, will register on the meter and indicator. If the value of the resistor 36 is too low, on the other hand, it will drain the charge off the capacities 35 and 36D before an effective measurement can be made.

While the outer surface of the rotor 24 should be at about the level of the exterior surface 12 of the aircraft, as shown, it is obvious that the outer surface of the rotor 24 may project further from the surface of the aircraft, or even be further within the surface of the aircraft, as long as the effective charge on the surface can be applied to the appropriate metallic strips 22A through 22K.

The metallic strips or laminations or plates 22A through 22K may be of any convenient size and shape. The longer and wider the strips, the larger the plate surface. The larger the plate surface, the greater the charge it can hold and carry as the rotor turns. The larger the charge, the less sensitive the amplifying and metering system that will be needed to indicate the charge.

However, the width of these metallic strips 22A through 22K will also establish the number of strips that can be placed peripherally around the rotor, and the number of voltage samples per rotation, which, together with the speed of the rotor will determine the frequency of sampling of the surface charge. The greater the number of plates and the higher the speed of rotation, the faster the response time, and the more sensitive the field strength measuring device will be to instantaneous changes in the field strength.

The material of the metallic strips may be the typical materials used in Van der Graaf generators. These strips may be of certain conductive material but should be of the same material as the brush to avoid contact potential effects. The materials used for this sort of strips are usually very hard and highly conductive; to stand the wear of the contacts and to get a charge on and off the strips as quickly as possible. The strips 22A through 22K and contact arms 13, 39, and 14 obviously should be noncorrosive if they are to be exposed to the atmosphere.

While we have shown a drum-shaped variation of the Van der Graaf principle, it is obvious that a belt or other charge transfer means can be used as long as it presents a successive series of plates that can be charged at one point and can carry the charge to another where it can be measured.

A plastic protective cover can be put over the contact arms 13 and the exposed surface of the rotor in a well known manner but this would, inevitably, reduce the effective charge on the surface, because of charged particles lodged on the plastic surface. Such charges can be dissipated by resistive coating of the plastic surface, resulting in a severe loss of sensitivity. However, this may be desirable from the standpoint of protection from the elements and the loss in signal can be overcome by additional amplification, larger strips, or a larger sized unit.

The amplifier shown here may be of any conventional amplifier with enough sensitivity to accommodate the potentials that can be expected from any electrostatic field that would be considered to be of interest or dangerous. A typical standard amplifier such as an MOS FET OP amplifier would respond to inputs as low as millivolts and provide sufficient output voltage to give an indication on a conventional meter.

While an indicating meter 38 is shown to read the relative voltage of or charge on the metallic strips 22A through 22K, which is a function of the relative charge on the surface 12 of the aircraft, it is obvious that a whole series of functional devices may be used. For example, a voltage-sensitive circuit can actuate a warning light; a telemetering device may be actuated to give a warning signal; or a relay may actuate a device for discharging the aicraft when the field strength indicates the presence of dangerous electrostatic potentials.

We wish it to be understood that we do not desire to be limited to the exact details of construction shown and described, for obvious modifications will occur to a person skilled in the art.

What is claimed is:

1. An electrostatic charge concentration measuring device for a metallic object having an outer surface and an inner surface; comprising:
   a metallic enclosure attached to said inner surface of said metallic object;
   a rotor, positioned within said enclosure, having a surface of insulating material extending adjacent to an opening in said metallic object;
   a series of metallic strips having a surface area substantially equal to the opening in said metallic object mounted axially about the periphery of said insulating surface, on said rotor;

means for rotating said rotor to bring said strips, successively, substantially level with said outer surface of said metallic object;

a first contact means, mounted outside said metallic object, having one end positioned to engage each of said strips in turn as it becomes substantially level with said outer surface of said metallic object, the other end of said first contact means being connected to said outer surface of said metallic object;

a second contact means, mounted within said enclosure, having one end positioned to engage each of said strips in turn, at a location within said enclosure after said strips have left said first contact means;

an amplifying means mounted within said enclosure, having an input and an output;

means connected to the other end of said second contact means and to said input of said amplifying means for discharging said strips through said input of said amplifying means; and a utilization means connected to said output of said amplifying means.

2. An electrostatic charge concentration measuring device as in claim 1 having a third contact means, mounted within said enclosure, with one end positioned to engage each of said strips, in turn at a location within said enclosure after said strips have left said second contact means; and means for connecting the other end of said third contact means to said inner surface of said metallic object.

3. An electrostatic charge concentration measuring device as in claim 1 wherein said first contact means comprises a plurality of spring-loaded contact arms having said one ends positioned along the length of said cylindrical surface to engage corresponding portions of each of said strips in turn.

4. An electrostatic charge concentration measuring device as in claim 1 wherein said amplifying means comprises a pair of input terminals, having means for connecting one of said input terminals to said other end of said second contact means; means for connecting the other of said input terminals to the inner surface of said metallic object; and an input resistor connected across said pair of input terminals.

5. An electrostatic charge concentration measuring device as in claim 1 wherein said utilization means is a meter for indicating the electrostatic charge on said outer surface of said metallic object.

6. An electrostatic charge concentration measuring device as in claim 1, further comprising:

a concentric, metallic portion of said rotor below said surface of insulating material; and means for connecting said concentric, metallic portion of said rotor to said inner surface of said metallic object.

* * * * *